United States Patent
Chang et al.

(10) Patent No.: US 12,367,419 B2
(45) Date of Patent: Jul. 22, 2025

(54) GAME-THEORETIC INVARIANT RATIONALIZATION OF MACHINE-LEARNING RESULTS

(71) Applicants: International Business Machines Corporation, Armonk, NY (US); Massachusetts Institute of Technology, Cambridge, MA (US)

(72) Inventors: Shiyu Chang, Elmsford, NY (US); Yang Zhang, Cambridge, MA (US); Mo Yu, White Plains, NY (US); Tommi S. Jaakkola, Cambridge, MA (US)

(73) Assignees: International Business Machines Corporation, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 1289 days.

(21) Appl. No.: 17/095,688

(22) Filed: Nov. 11, 2020

(65) Prior Publication Data

US 2022/0147864 A1 May 12, 2022

(51) Int. Cl.
*G06F 40/284* (2020.01)
*G06F 40/00* (2020.01)
(Continued)

(52) U.S. Cl.
CPC .............. *G06N 20/00* (2019.01); *G06F 40/00* (2020.01); *G06N 5/045* (2013.01); *G06Q 30/0201* (2013.01); *G06F 40/284* (2020.01)

(58) Field of Classification Search
CPC ....................................................... G06F 40/284
See application file for complete search history.

(56) References Cited

U.S. PATENT DOCUMENTS

| | | |
|---|---|---|
| 10,565,528 B2 | 2/2020 | Lokare et al. |
| 2019/0188602 A1 | 6/2019 | Kwant et al. |

(Continued)

FOREIGN PATENT DOCUMENTS

| | | | |
|---|---|---|---|
| CN | 109522546 B | * 4/2021 | .......... G06F 40/284 |
| WO | WO2019010147 A1 | 1/2019 | |
| WO | WO2019199719 A1 | 10/2019 | |

OTHER PUBLICATIONS

Dasgupta et al., A survey of game theoretic approaches for adversarial machine learning in cybersecurity tasks. arXiv preprint arXiv:1912.02258, 13 pages, Dec. 2019.

(Continued)

*Primary Examiner* — Feng-Tzer Tzeng
(74) *Attorney, Agent, or Firm* — Caleb Wilkes; Otterstedt & Kammer PLLC

(57) ABSTRACT

To improve actual labels that are produced by a black box computer classifier system from inputs, identify, using an environment-aware predictor and an environment-agnostic predictor, a subset of the inputs. The subset of the inputs has a stable correlation with the actual labels across a plurality of environments. Identify the subset of the inputs as an explanatory rationale for the actual labels. Display the explanatory rationale with the actual labels to a consumer of the actual labels. Optionally, in response to the explanatory rationale failing a rubric established by the consumer, generate revised inputs by removing the explanatory rationale from the inputs; and produce revised labels by processing the revised inputs with the environment-agnostic predictor.

20 Claims, 7 Drawing Sheets

(51) Int. Cl.
   *G06N 5/045*      (2023.01)
   *G06N 20/00*     (2019.01)
   *G06Q 30/0201*   (2023.01)

(56) References Cited

U.S. PATENT DOCUMENTS

2019/0220748 A1    7/2019  Denil et al.
2019/0311301 A1*  10/2019  Pyati .................. G06F 16/901

OTHER PUBLICATIONS

Shiyu Chang, et al., "Invariant Rationalization," arXiv:2003.09772v1 Mar. 2020, pp. 1-10. Grace Period Disclosure under 35 U.S.C. § 102(b)(1)(A).
Shiyu Chang, et al., "Invariant Rationalization," International Conference on Machine Learning 2020, Jul. 2020, pp. 1-10. Grace Period Disclosure under 35 U.S.C. § 102(b)(1)(A).
Peter Mell and Timothy Grance, The NIST Definition of Cloud Computing, NIST Special Publication 800-145, cover, pp. i-iii, 1-3, Sep. 2011.

* cited by examiner

GAME-THEORETIC INVARIANT RATIONALIZATION OF MACHINE-LEARNING RESULTS

STATEMENT REGARDING PRIOR DISCLOSURES BY THE INVENTOR OR A JOINT INVENTOR

The following disclosure(s) are submitted under 35 U.S.C. 102(b)(1)(A):

"Invariant Rationalization," Shiyu Chang, Yang Zhang, Mo Yu, Tommi S. Jaakkola, arXiv:2003.09772v1 Mar. 22, 2020, pages 1-10;

"Invariant Rationalization," Shiyu Chang, Yang Zhang, Mo Yu, Tommi S. Jaakkola, International Conference on Machine Learning 2020, Jul. 12, 2020, pages 1-10.

BACKGROUND

The present invention relates to the electrical, electronic, and computer arts, and more specifically, to explanations of the labels produced by artificial intelligences such as neural networks.

A number of selective rationalization techniques have been proposed to explain the predictions of complex neural models. The key idea driving these methods is to find a small subset of the input features—a rationale—that suffices on its own to yield the same outcome. In practice, rationales that remove much of the spurious content from the input, e.g., text, could be used and examined as justifications for a model's predictions.

A commonly used criterion for generating rationales is "maximum mutual information" (MMI). In the context of natural language processing (NLP), it defines the rationale as the subset of input text that maximizes the mutual information between the subset and the model output, subject to the constraint that the selected subset remains within a prescribed length. Specifically, if the random variables corresponding to input are denoted as $\hat{X}$, rationales as $\hat{Z}$, and the model output as Y, then the MMI criterion finds the explanation $\hat{Z}=Z(\hat{X})$ that yields the highest prediction accuracy of Y.

The MMI criterion can nevertheless lead to undesirable results in practice. It is prone to highlighting spurious correlations between the input features and the output as valid explanations. While such correlations represent statistical relations present in the training data, and thus incorporated into the neural model, the impact of such features on the true outcome (as opposed to the model's predictions) can change at test time. In other words, MMI may select features that do not explain the underlying relationship between the inputs and outputs even though they may still be faithfully reporting the model's behavior.

SUMMARY

Principles of the invention provide techniques for game-theoretic invariant rationalization of machine-learning results. In one aspect, an exemplary method includes improving actual labels that are produced by a black box computer classifier system from inputs. The method includes: identifying a subset of the inputs as an explanatory rationale for the actual labels, using an environment-aware predictor and an environment-agnostic predictor. The subset of the inputs has a stable correlation with the actual labels across a plurality of environments. The method also includes displaying the explanatory rationale with the actual labels to a consumer of the actual labels; and in response to the explanatory rationale failing a rubric established by the consumer: generating revised inputs by removing the explanatory rationale from the inputs; and producing revised labels by processing the revised inputs with the environment-agnostic predictor.

According to another aspect, an exemplary method for correcting implicit bias in human decision making comprises: obtaining actual labels that were applied by a human decisionmaker to inputs that include confounding data and an explanatory rationale, wherein the confounding data and the explanatory rationale are not initially distinguished from each other; distinguishing the explanatory rationale from the confounding data, by identifying a stable correlation of the explanatory rationale with the actual labels across a plurality of environments using an environment-aware predictor and an environment-agnostic predictor; and informing a responsible party that the explanatory rationale matches a pertinent rubric.

According to another aspect, a non-transitory computer readable medium embodies computer executable instructions which when executed by a computer cause the computer to facilitate a method for improving actual labels produced by a black box computer classifier system from inputs, generally as discussed above.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Causal explanation of results produced by a machine learning algorithm.

Explanations of results that are generalizable to novel environments.

Improvement of labels produced by a black box computer classifier system.

Detection and correction of human decision-maker bias by training, rationalizing, and retraining a machine learning tool (environment-agnostic predictor).

These and other features and advantages of the present invention will become apparent from the following detailed description of illustrative embodiments thereof, which is to be read in connection with the accompanying drawings.

DETAILED DESCRIPTION

Figure 1:
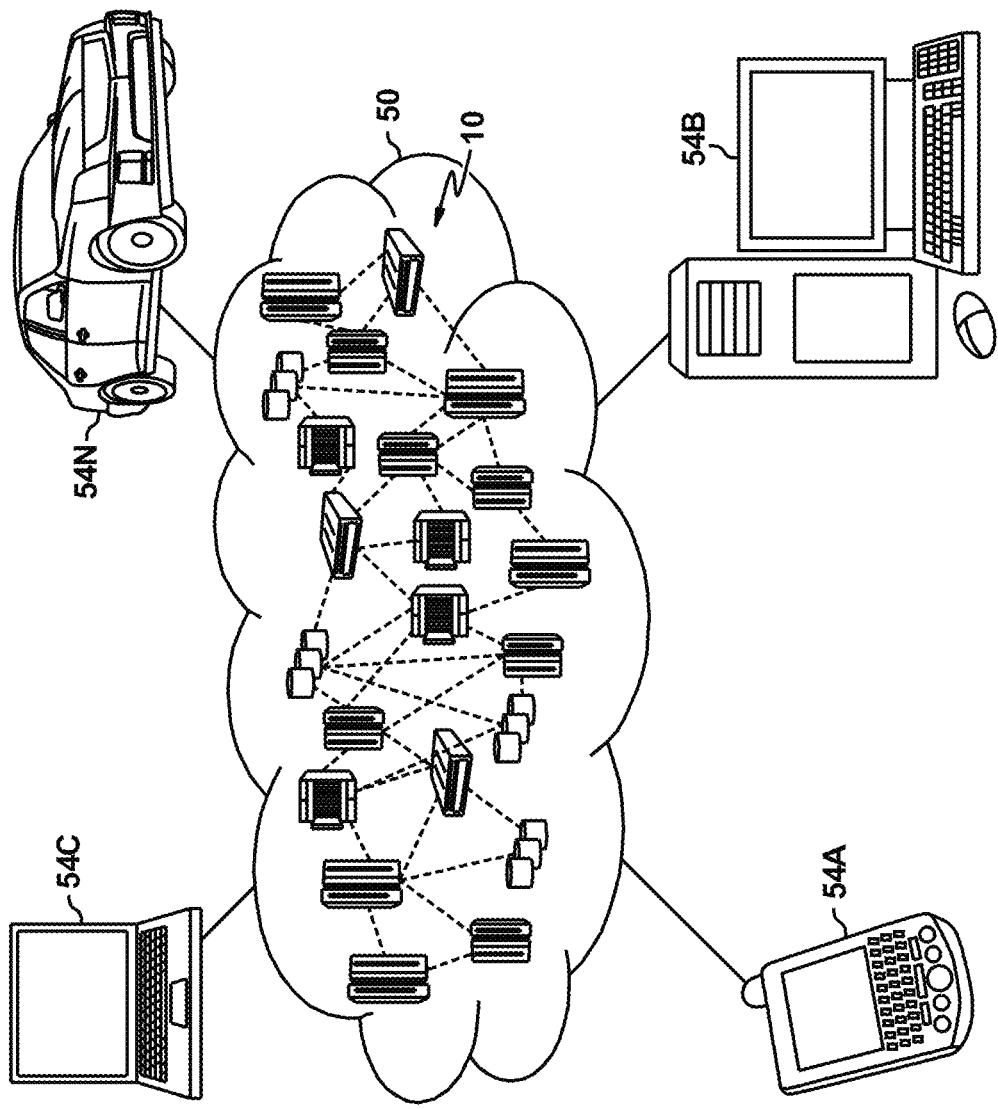
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
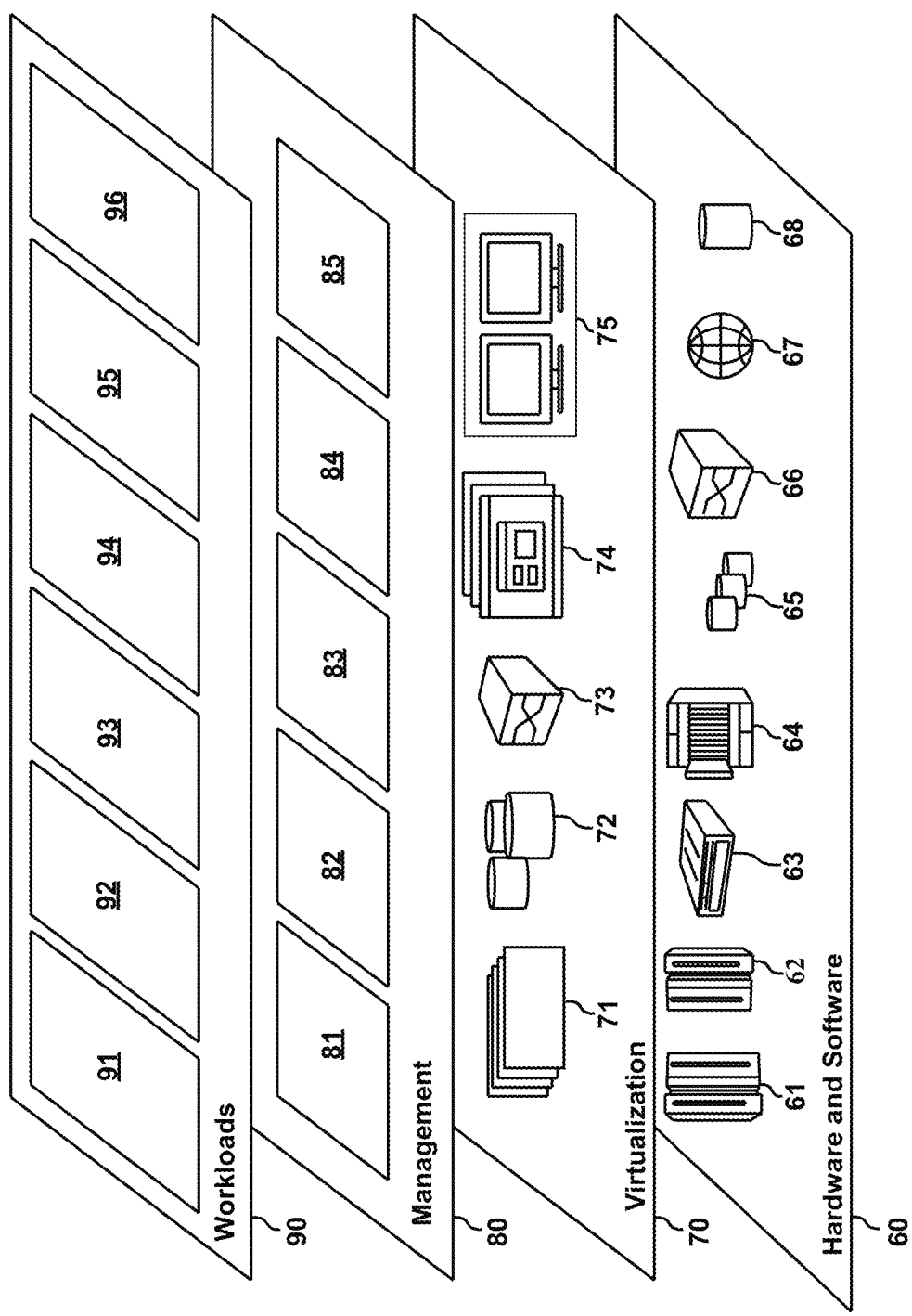
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an invariant rationalization (INVRAT) system 96, further described below with particular references to FIGS. 5, 6, and 7A-7B.

In explaining or justifying the results of a machine learning algorithm to users of the algorithm, a rationalization criterion is a type of mask that is applied to the inputs to the algorithm in order to generate a subset of the inputs, known as the "rationale," that is believed to adequately explain the output of the algorithm. One or more embodiments of the INVRAT system 96 advantageously modify a rationalization criterion to better tailor it to find causal features. As an example, consider review 100 of a toy truck, shown in FIG. 3. The review 100 covers several aspects of the truck: appearance 102, ergonomics 104, durability 106, and overall 108. Suppose a numeric score also is assigned to each of these aspects, and it is desired to find an explanation supporting a positive score for durability. The correct explanation should be the portion 106 of the review that actually discusses durability. However, reviews for other aspects such as ergonomics 104 may co-vary with the durability score since, as consequences of mechanical design, durability and ergonomics may be related. The overall statement 108 would typically also clearly correlate with any individual aspect score, including durability. Taken together, portions 104, 106 and the overall statement 108 would all be highly correlated with a positive score for durability. As a result, MIMI may select any one of them (or some combination) as the rationale, depending on precise statistics in the training data. However, only portion 106 constitutes an adequate explanation (as opposed to mere correlation) of a score for durability.

A desirable rationalization criterion approximates finding causal features. While assessing causality is challenging, the task is approximated by identifying features that are in some sense invariant. A pertinent aspect is to highlight spurious (non-causal) variation by dividing the data into different environments. The same predictor, if based on causal features, should remain optimal in each environment separately.

As disclosed herein, invariant rationalization (INVRAT) is a novel rationalization scheme that incorporates the invariance constraint. INVRAT extends invariant risk minimization (IRM) principles to neural network predictions by employing a game-theoretic framework to impose invariance. Specifically, the proposed framework includes three modules: a rationale generator, an environment-agnostic predictor, and an environment-aware predictor. The rationale generator generates rationales $\hat{Z}$ from the input $\hat{X}$, and both predictors try to predict Y from $\hat{Z}$. The only difference between the two predictors is that the environment-aware predictor knows from which environment each training data point is drawn. The goal of the rationale generator is to restrict the rationales in a manner that closes the performance gap between the two predictors while still maximizing the prediction accuracy of the environment-agnostic predictor.

INVRAT can solve the invariant rationalization problem, and the invariant rationales generalize well to unknown test environments in a well-defined minimax sense. Evaluating INVRAT on multiple datasets with false correlations, by comparison to baseline computational methods and by comparison to human labeling, shows that INVRAT removes false correlations and finds explanations that align with human judgments, significantly better than baseline computational methods.

For the sake of informing the reader, consider the MMI criterion and analyze its limitation using a probabilistic model. Upper-cased letters, X and $\hat{X}$ (shown as bold X in equations), denote random scalars and vectors respectively;

lower-cased letters, x and x̂ (shown as bold x in equations), denote deterministic scalars and vectors respectively; H(X̂) denotes the Shannon entropy of X̂; H(Y|X̂) denotes the entropy of Y conditional on X̂; I(Y;X̂) denotes the mutual information. Without causing ambiguities, px̂(•) and p(X̂) are used interchangeably to denote the probabilistic mass function of X̂.

The MMI objective can be formulated as follows. Given the input-output pairs (X̂,Y), MMI aims to find a rationale Ẑ, which is a masked version of X̂, such that it maximizes the mutual information between Ẑ and Y according to $$\max_{m \in S} I(Y; Z) \text{ s.t. } Z = m \odot X, \quad (1)$$

where m is a binary mask, S denotes a subset of $\{0, 1\}^N$ with sparsity and continuity constraints, and N is the total length in X̂. The circled dot represents element-wise multiplication of two vectors or matrices, and "s.t." stands for "such that." Since the mutual information measures the predictive power of Ẑ on Y, MMI essentially tries to find a subset of input features that can best predict the output Y.

A pertinent issue with MMI is that it sometimes picks up spurious probabilistic correlations, rather than finding a causal explanation. To demonstrate why this is the case, consider a probabilistic graph in FIG. 4, where X̂ is divided into three variables, $\hat{X}_1$, $\hat{X}_2$ and $\hat{X}_3$, which represents the three typical relationship with Y: $\hat{X}_1$ influences Y; $\hat{X}_2$ is influenced by Y; $\hat{X}_3$ has no direction connections with Y. The dashed arrows represent some additional probabilistic dependencies among X̂. For now, E (the environment) can be ignored.

Figure 4:
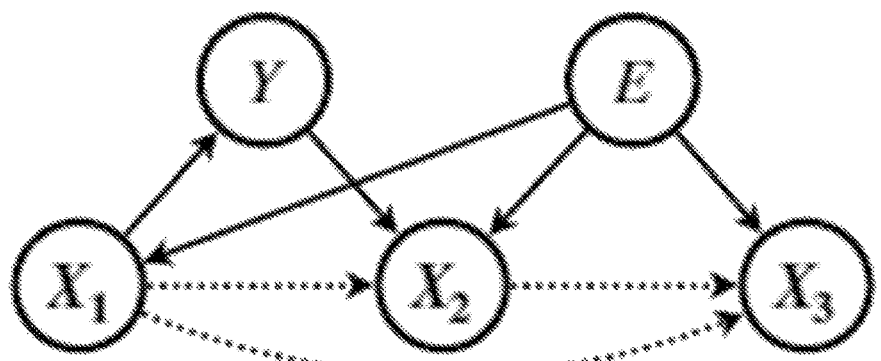
FIG. 4 depicts a probability graph of different data considered by the machine-learning algorithm in assigning scores, according to an exemplary embodiment.

As observed from FIG. 4, $\hat{X}_1$ serves as the valid explanation of Y, because it is the true cause of Y. Neither $\hat{X}_2$ nor $\hat{X}_3$ are valid explanations. However, $\hat{X}_1$, $\hat{X}_2$ and $\hat{X}_3$ can all be highly predictive of Y, so the MMI criterion may select any of the three features as the rationale. Concretely, consider the following simple example with all binary variables. Assume $p\hat{X}_1(1)=0.5$, and $$p_{Y|X_1}(1|1) = p_{Y|X_1}(0|0) = 0.9, \quad (2)$$

which makes $\hat{X}_1$ a good predictor of Y. Next, define the conditional prior of $\hat{X}_2$ as $$p_{X_2|Y}(1|1) = p_{X_2|Y}(0|0) = 0.9.$$

According to the Bayes rule, $$p_{Y|X_2}(1|1) = p_{Y|X_2}(0|0) = 0.9, \quad (3)$$

which makes $\hat{X}_2$ also a good predictor of Y. Finally, assume the conditional prior of $\hat{X}_3$ is $$p_{X_3|X_1,X_2}(1|1,1) = p_{X_3|X_1,X_2}(0|0,0) = 1, \text{ and}$$

$$p_{X_3|X_1,X_2}(1|0,1) = p_{X_3|X_1,X_2}(1|1,0) = 0.5.$$

It can be computed that $$p_{X_3|Y}(1|1) = p_{X_3|Y}(0|0) = 0.9. \quad (4)$$

In short, according to the above equations, there exists a set of priors such that the predictive power of $\hat{X}_1$, $\hat{X}_2$ and $\hat{X}_3$ is exactly the same. As a result, there is no reason for MMI to favor $\hat{X}_1$ over the others.

Figure 3:
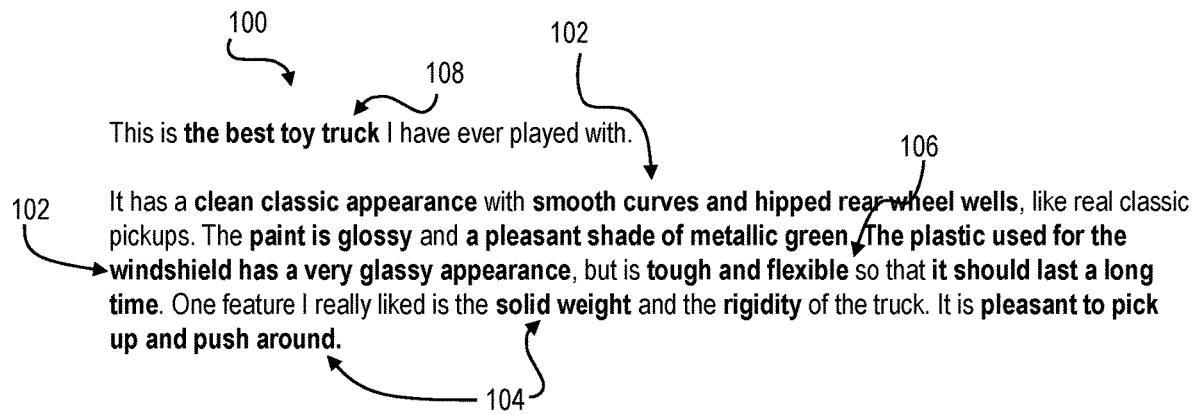
FIG. 3 depicts a toy truck review for which a machine-learning algorithm assigns scores and a rationale generator produces explanations for those scores, according to an exemplary embodiment.

In fact, $\hat{X}_1$, $\hat{X}_2$ and $\hat{X}_3$ correspond to the bolded text in FIG. 3. $\hat{X}_1$ corresponds to the durability review text 106, because it represents the true explanation that influences the output decision (durability score). $\hat{X}_2$ corresponds to the overall review 108, because the overall summary of the toy truck inversely influences the durability score. Finally, $\hat{X}_3$ corresponds to the ergonomics review 104, because the ergonomics review does not have a direct relationship with the durability score, but still may be highly predictive of the durability score because it can be strongly correlated with $\hat{X}_1$ and $\hat{X}_2$.

Aspects of the invention explore a novel rationalization scheme that can distinguish $\hat{X}_1$ from the rest. The new scheme, called "INVRAT" herein, is a game-theoretic solution to the invariant rationalization problem.

Without further information, distinguishing $\hat{X}_1$ from $\hat{X}_2$ and $\hat{X}_3$ is a challenging task. However, this challenge can be resolved if access is also available to an extra piece of information: the environment. As shown in FIG. 4, an environment is defined as an instance of the variable E that impacts the prior distribution of X̂. Assume that $p(Y|\hat{X}_1)$ remains the same across the environments (hence there is no edge pointing from E to Y in FIG. 4), because $\hat{X}_1$ is a true cause of Y. If $\hat{X}_2$ and $\hat{X}_3$ are not true causes of Y, then $p(Y|\hat{X}_2)$ and $p(Y|\hat{X}_3)$ will not remain the same across the environments, which distinguishes $\hat{X}_1$ from $\hat{X}_2$ and $\hat{X}_3$.

Back to the simple binary example, suppose there are two environments, $e_1$ and $e_2$. In environment $e_1$, all the prior distributions are exactly the same as in equations (1)-(4). In environment $e_2$, the priors are almost the same, except for the prior of $\hat{X}_1$. For simpler notation, define $q_X(\cdot)$ as the probability, under environment $e_2$, of a variable represented by the dot, i.e. $p_{X|E}(\cdot|e_2)$. Then, assume that $$q_{X_1}(1) = 0.6.$$

It turns out that such a small change from equation (1) suffices to expose $\hat{X}_2$ and $\hat{X}_3$ as not being true causes of Y. Taking $q(Y|\hat{X}_1)$ as in equation (2), it can be computed that $$q_{Y|X_2}(1|1) \approx 0.926, q_{Y|X_2}(0|0) \approx 0.867,$$

$$q_{Y|X_3}(1|1) \approx 0.912, q_{Y|X_3}(0|0) \approx 0.883,$$

which are different than equations (3) and (4). Notice that any changes in the priors of $\hat{X}_2$ and $\hat{X}_3$, which will introduce further differences, have not yet been assumed. The fundamental cause of such differences is that Y is independent of E only when conditioned on $\hat{X}_1$, so $p_{Y|\hat{X}_1}(\cdot|\cdot)$ would not change with E. This property is referred to herein as invariance. However, the conditional independence does not hold for $\hat{X}_2$ and $\hat{X}_3$.

Therefore, given access to multiple environments during training, i.e. multiple instances of E, consider an invariant rationalization objective as follows:

$$\max_{m \in S} I(Y; Z) \text{ s.t. } Z = m \odot X, Y \perp E | Z, \quad (5)$$

where ⊥ denotes probabilistic independence. The only difference between equations (1) and (5) is that the latter has the invariance/independence constraint, which is used to screen out $\hat{X}_2$ and $\hat{X}_3$. In practice, finding an eligible environment is feasible. In the toy truck review example in FIG. 3, a possible choice of environment is the brand of toy truck, because different toy truck brands have different prior distributions of the review in each aspect—some brands are better at the appearance, others better at the durability. Such variations in priors suffice to expose the non-invariance of the appearance review or the overall review in terms of predicting the durability score.

Figure 5:
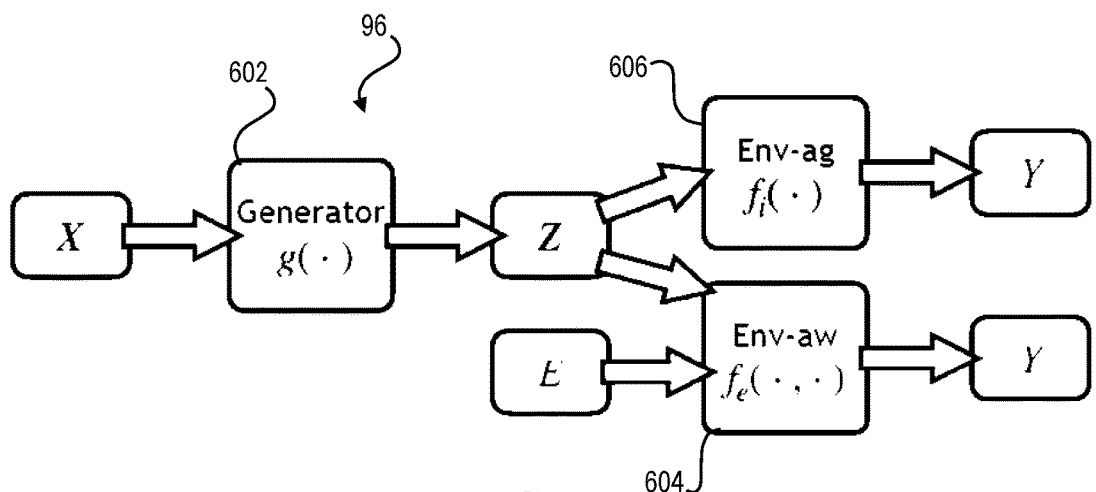
FIG. 5 depicts interactions of software modules for generating rationales for the machine-learning algorithm, according to an exemplary embodiment.

The constrained optimization in equation (5) is hard to solve in its original form. INVRAT introduces a game-theoretic framework, which can approximately solve this problem. Notice that the invariance constraint can be converted to a constraint on entropy, i.e., $$Y \perp E|Z \Leftrightarrow H(Y|Z,E)=H(Y|Z), \quad (6)$$

which means if $\hat{Z}$ is invariant, E cannot provide extra information beyond $\hat{Z}$ to predict Y. Guided by this perspective, INVRAT 96 includes three players, as shown in FIG. 5:

a rationale generator, $g(\hat{X})$ 602;
an environment-aware predictor $f_e(\hat{Z}, E)$ 604; and
an environment-agnostic/-independent predictor $f_i(\hat{Z})$ 606.

The rationale generator g produces $\hat{Z}$ by masking $\hat{X}$. The goal of the environment-agnostic and environment-aware predictors is to predict Y from the rationale $\hat{Z}$. The only difference between them is that the environment-aware predictor $f_e$ has access to E (the environment identifier) as an input feature but the environment-independent predictor $f_i$ does not. Formally, denote $\mathcal{L}(Y; f)$ as the cross-entropy loss on a single instance. Then the learning objective of these two predictors can be written as follows.

$$\mathcal{L}_i^* = \min_{f_i(\cdot)} \mathbb{E}[\mathcal{L}(Y; f_i(Z))], \mathcal{L}_e^* = \min_{f_e(\cdot)} \mathbb{E}[\mathcal{L}(Y; f_e(Z, E))], \quad (7)$$

where $\hat{Z}=g(\hat{X})$.

The goal of the rationale generator is also to minimize the invariance prediction loss $\mathcal{L}_i^*$. However, there is an additional goal to make the gap between $\mathcal{L}i^*$ and $\mathcal{L}e^*$ small. Formally, the objective of the generator is:

$$\min_{g(\cdot)} \mathcal{L}_i^* + \lambda h(\mathcal{L}_i^* - \mathcal{L}_e^*) \quad (8)$$

where h(t) is a convex function that is monotonically increasing in t when t<0, and strictly monotonically increasing in t when t≥0, e.g., h(t)=t and h(t)=ReLU(t).

Equations (7) and (8) can solve equation (5) in its Lagrangian form. If the representation power of $f_i(\cdot)$ and $f_e(\cdot, \cdot)$ is sufficient, the cross-entropy loss can achieve its entropy lower bound, i.e., $$\mathcal{L}_i^* = H(Y|Z), \mathcal{L}_e^* = H(Y|Z,E)$$

Notice that the environment-aware loss should be no greater than the environment-agnostic loss, because of the availability of more information, i.e., $H(Y|\hat{Z}) \geq H(Y|\hat{Z}; E)$. Therefore, the invariance constraint in equation (6) can be rewritten as an inequality constraint:

$$H(Y|Z)=H(Y|Z,E) \Leftrightarrow H(Y|Z) \leq H(Y|Z, E) \quad (9)$$

Finally, notice that $I(Y; \hat{Z})=H(Y)-H(Y|\hat{Z})$. Thus, the objective in equation (8) can be regarded as the Lagrange form of equation (5), with the constraint rewritten as an inequality constraint $$h(H(Y|Z)-H(Y|Z,E)) \leq h(0) \quad (10)$$

According to the Karush-Kuhn-Tucker (KKT) conditions, which are familiar to the ordinary skilled worker, λ>0 when equation (10) is binding. Moreover, the objectives in equations (7) and (8) can be rewritten as a minimax game $$\min_{g(\cdot), f_i(\cdot)} \max_{f_e(\cdot, \cdot)} \mathcal{L}_i(g, f_i) + \lambda h(\mathcal{L}_i(g, f_i) - \mathcal{L}_e(g, f_e)) \quad (11)$$

where $$\mathcal{L}_i(g,f_i) = \mathbb{E}[\mathcal{L}(Y;f_i(Z))], \mathcal{L}_e(g,f_e)=\mathbb{E}[\mathcal{L}(Y;f_e(Z,E))].$$

Therefore, the generator plays a co-operative game with the environment-agnostic predictor, and an adversarial game with the environment-aware predictor. The optimization can be performed using alternate gradient descent/ascent.

The invariant rationale can be justified in the sense that it can uncover consistent and causal explanations and leave out spurious statistical correlations. Additionally, it can be justified in terms of generalizability. Consider two sets of environments, a set of training environments $\{e_t\}$ and a test environment $e_a$. Only the training environments are accessible during training. The prior distributions in the test environment are completely unknown. The question to be asked is: does keeping the invariant rationales and dropping the non-invariant rationales improve the generalizability in the unknown test environment?

Assume that 1) the training data are sufficient, 2) the predictor is environment-agnostic, 3) the predictor has sufficient representation power, and 4) the training converges to the global optimum. Under these assumptions, any predictor is able to replicate the training set distribution (with all the training environments mixed) $p(Y|\hat{Z}, E\in\{e_t\})$, which is optimal under the cross-entropy training objective. In the test environment $e_a$, the cross-entropy loss of this predictor is given by)

$$\mathcal{L}_{test}^*(Z)=H(p(Y|Z,e_a);p(Y|Z,\{e_t\}))$$

where $p(Y|\hat{Z}, \{e_t\})$ is short for $p(Y|E\in\{e_t\})$. $\mathcal{L}^*_{test}(\hat{Z})$ cannot be evaluated because in the test environment the prior distribution is not known.

Consider the following shorthand for the test environment distributions:

$$\pi_1(x_1)=p_{X_1|E}(x_1|e_a),$$

$$\pi_2(x_2|x_1,y)=p_{X_2|X_1,Y,E}(x_2|x_1,y,e_a).$$

$$\pi_3(x_3|x_1,x_2)=p_{X_3|X_1,X_2,E}(x_3|x_1,x_2,\bullet,e_a)$$

For the selected rationale Z, consider an adversarial test environment (hence the notation $e_a$), which chooses $\pi_1$, $\pi_2$, $\pi_3$ to maximize $\mathcal{L}^*_{test}(\hat{Z}; \pi_1, \pi_2, \pi_3)$. The following theorem shows that the minimizer of this adversarial loss is the invariant rationale $\hat{X}1$.

The sparsity and continuity constraint m∈S (equation (5)) stipulates that the total number of 1's in m (the binary mask used for establishing $\hat{Z}$ from $\hat{X}_1$) should be upper bounded and contiguous. There are two ways to implement the constraints.

Soft constraints: Add another two Lagrange terms to equations (11):

$$\mu_1 \left| \frac{1}{N}\mathbb{E}[\|m\|_1] - \alpha \right| + \mu_2 \mathbb{E}\left[\sum_{n=2}^{N} |m_n - m_{n-1}|\right] \quad (12)$$

where $m_n$ denotes the n-th element of m; α is a predefined sparsity level; and m is produced by an independent selection process. This method is flexible, but requires sophisticated tuning of three Lagrange multipliers.

Hard constraints: An alternative approach is to force $g(\cdot)$ to select one chunk of text with a pre-specified length l. Instead of predicting the mask directly, $g(\cdot)$ produces a score $s_n$ for each position n, and predicts the start position of the chunk by choosing the maximum of the score. Formally:

$$n^* = \underset{n}{\mathrm{argmax}}\, s_n,\, m_n = \mathbb{1}[n \in [n^*, n^* + l - 1]] \tag{13}$$

where $\mathbb{1}$ denotes the indicator function, which equals 1 if the argument is true, and 0 otherwise. Equation (13) is not differentiable, so when computing the gradients for the back propagation, apply the straight-through technique and approximate it with the gradient of $$\hat{s} = \mathrm{softmax}(s), m = \mathrm{CasualConv}(\hat{s})$$

where CausalConv(•) denotes causal convolution, and the convolution kernel is an all-one vector of length l.

To evaluate the invariant rationale generation, consider introducing spurious correlations into a dataset that consists of multiple thousands of product reviews for training and more thousands of product reviews for testing. The output Y is the binarized score of a product, with "1" being assigned for average reviews greater than a first threshold and "0" being assigned for average reviews less than a second threshold. Construct a synthetic setting that manually injects tokens with false correlations with Y, whose prior varies across artificial environments. The goal is to validate if the proposed method excludes these tokens from rationale selections. Specifically, first randomly split the training set into two balanced subsets, where each subset is considered as an environment. Append punctuation "," and "." at the beginning of each sentence with the following distributions:

$$p(\text{append ,}|Y=1, e_i) = p(\text{append .}|Y=0, e_i) = \alpha_i$$

$$p(\text{append .}|Y=1, e_i) = p(\text{append ,}|Y=0, e_i) = 1 - \alpha_i$$

Here i is the environment index taking values on $\{0; 1\}$. Specifically, set $\alpha_0$ and $\alpha_1$ to be 0.9 and 0.7, respectively, for the training set. Thus, products with net positive reviews in environment 0 will have on average more appended "," than will products with net positive reviews in environment 1; on the other hand, products with net negative reviews in environment 1 will have on average more appended "," than will products with net negative reviews in environment 0.

For the purpose of model selection and evaluation, split the original test set into two balanced subsets, which are the new validation and test sets. To test how different rationalization techniques generalize to unknown environments, also inject the punctuation to the test and validation set, but with $\alpha_0$ and $\alpha_1$ set as 0.5 for the validation set, and as 0.1, 0.3 for the testing set. According to equation (4.1), these manually injected "," and "." can be thought of as the $\hat{X}2$ variable in FIG. 4, which have strong correlations to the label Y but do not explain Y. It is worth mentioning that, in one or more embodiments, only the training set includes the environment identifier E.

Figure 6:
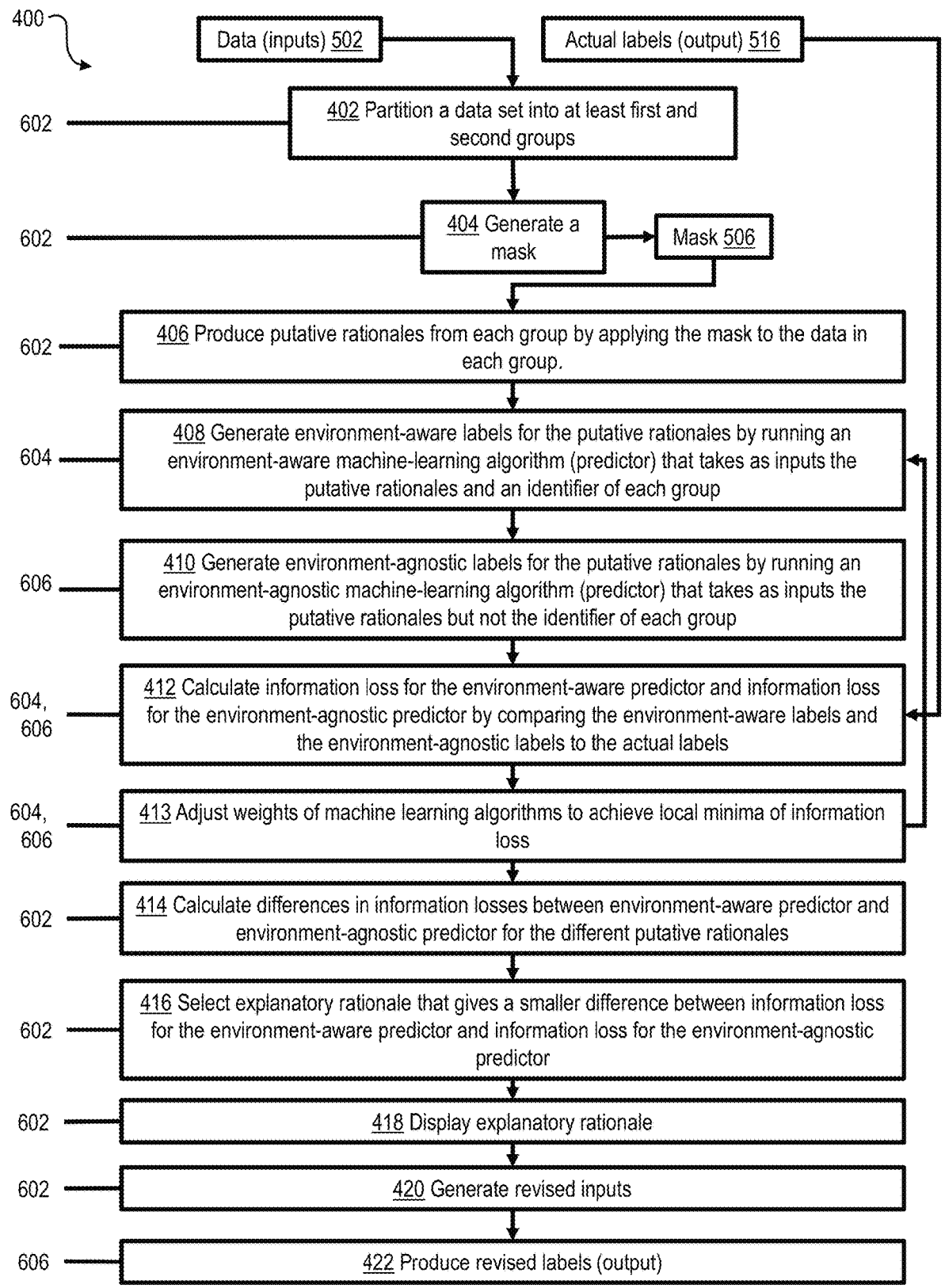
FIG. 6 depicts in a flowchart a method implemented by the software modules of FIG. 5, according to an exemplary embodiment.
Figure 7A:
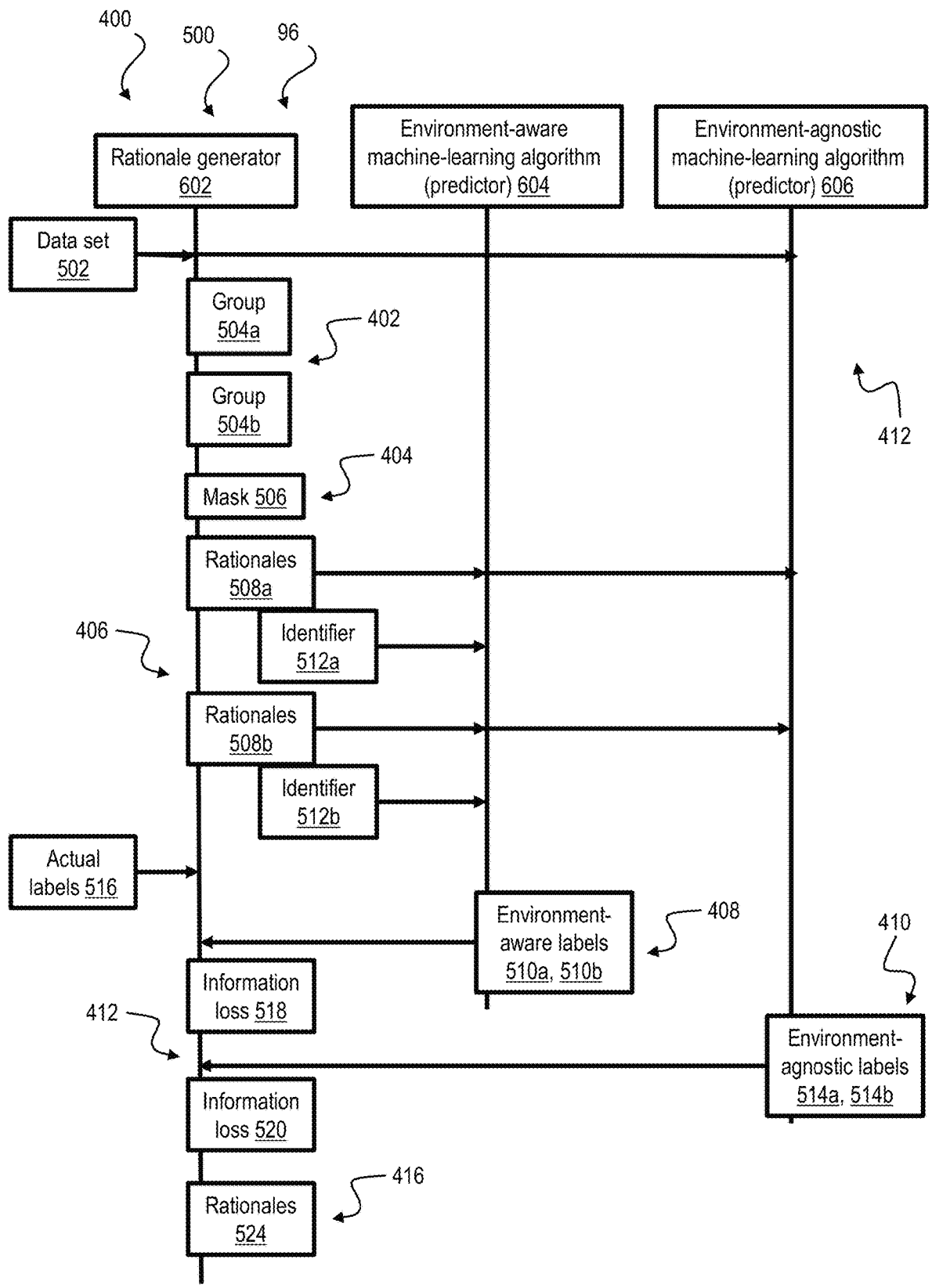
FIGS. 7A-7B depict in a schematic software modules and data flows for implementing the method of FIG. 5.

As a practical application of the above, it can be understood that rationales for a machine-learning algorithm's results (i.e. a matrix of rationales $\{\hat{Z}\}$ that reliably generate a vector of labels $\hat{Y}$ corresponding to the labels generated by the same machine-learning algorithm operating on fuller sets of data) can be obtained by a method 400, as shown in FIG. 6, which operates on data 500/502 and is implemented by components of the INVRAT system 96 as shown in FIG. 5. Referring to FIGS. 6 and 7A together, the method 400 includes several steps. At 402, a rationale generator 602 partitions a data set 502 into at least first and second groups 504a, 504b. At 404, the rationale generator 602 generates a mask 506 (the mask is a binary vector for multiplying the data 502 to drop out some data). At 406, the rationale generator 602 produces putative rationales 508a, 508b from each group 504a, 504b by applying the mask 506 to the data in each group.

At 408, generate environment-aware labels 510 by running an environment-aware machine-learning algorithm 604 on the masked data (putative rationales 508a, 508b) and on an identifier 512a, 512b of each group. At 410, generate environment-agnostic labels 514 by running an environment-agnostic machine-learning algorithm 606 on the masked data 508a, 508b but not on the identifier 512a, 512b of each group. At 412, calculate information loss 518 for the environment-aware machine-learning algorithm 604 and information loss 520 for the environment-agnostic machine learning algorithm 606 by comparing the environment-aware labels 510 and the environment-agnostic labels 514 to the actual labels 516.

At 413, the predictors (machine-learning algorithms 604 and 606) train themselves by adjusting their weights to minimize information loss for each predictor. Then at 414, the rationale generator 602 calculates differences in information losses 518 for the environment-aware machine learning algorithm 604 and information loss 520 for the environment-agnostic machine learning algorithm 606, given the respective putative rationales 508a, 508b. At 416, the rationale generator 602 selects the rationale that produces the smallest difference in information losses as the "true" rationale 524 for the actual labels 516. This is applying game-theoretic invariant rationalization to maximize a performance of an environment-agnostic predictor while minimizing a difference in performance between said environment-agnostic predictor and an environmentally-aware predictor.

Figure 7B:
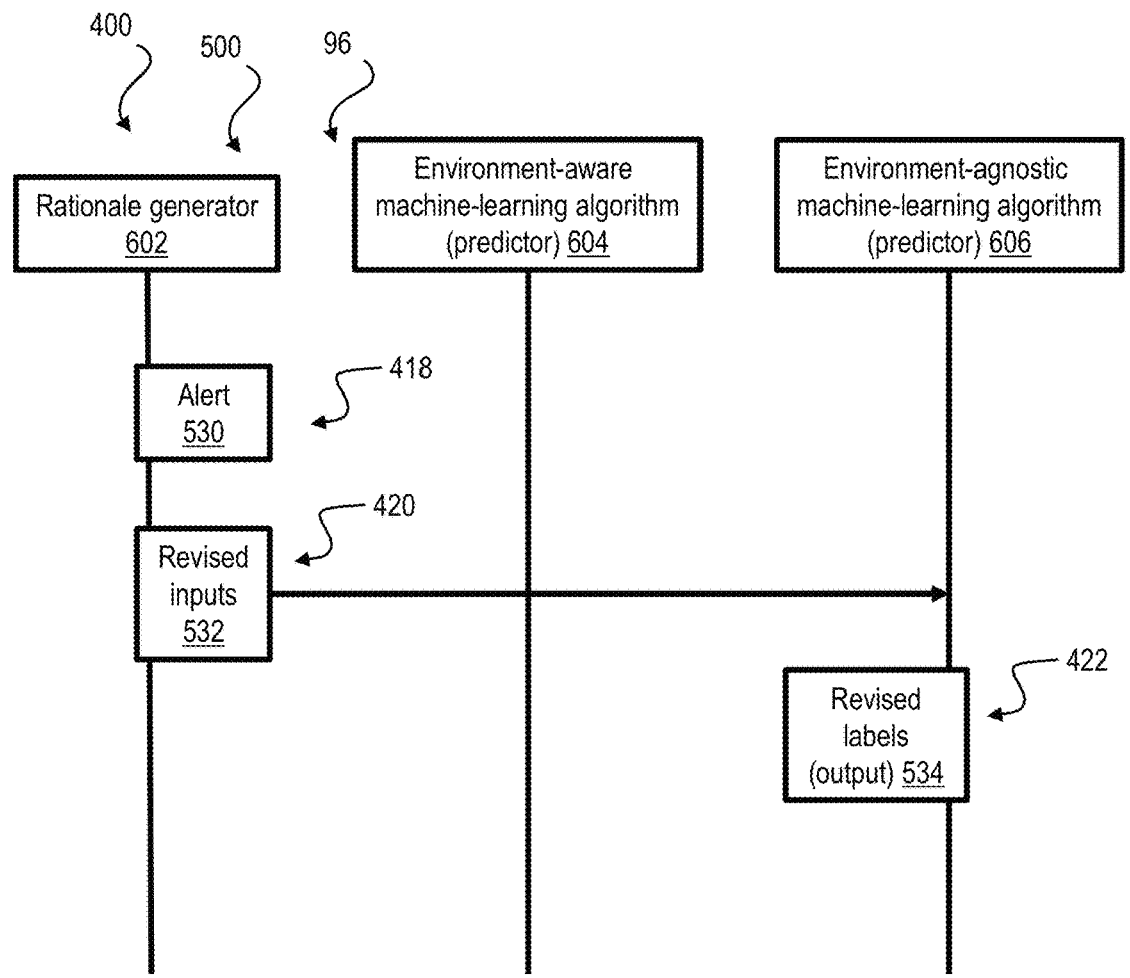

The rationales 524 explain the actual labels 516. Referring also to FIG. 7B, at 418, the rationale generator 602 displays the explanatory rationale, e.g., by way of an alert 530. At 420, in response to the explanatory rationale matching a rubric provided by a user, the rationale generator 602 generates revised inputs 532 that omit the explanatory rationale. At 422, the environment-agnostic predictor 606 generates revised labels 534 based on the revised inputs.

Note that, even though in practice prior distributions of Y are not known for the data $\hat{X}_1, \hat{X}_2, \hat{X}_3$, it is by definition the case that prior distributions for the confounding data $\hat{X}_2, \hat{X}_3$ will be different between any arbitrary first and second groups while prior distributions for the invariant $\hat{X}_1$ will be the same. Therefore, operation of the method 400 will produce a mask that reliably selects $\hat{X}_1$ as in the product reviews example above.

In one or more embodiments, the exemplary system 96 takes action in response to assessment of the rationales 524. As shown in FIGS. 7A-7B, in one or more embodiments the rationale generator 602 may generate an alert 530 that informs someone (e.g., a supervisor of a human decision-maker, or a decisionmaker herself/himself) regarding the nature of the rationales 524. Additionally or alternatively, the rationale generator 602 may generate revised inputs 532 by removing the rationales 524 from the data set 502. Rationales may be "removed" from the data, for example, by substituting a constant value (different from any existing value of the rationale) for all instances of a rationale across all the data. Revised inputs 532 may be desirable in case the rationales 524 are inconsistent with (i.e. "fail") a rubric established by a user. For example, it may be desirable to remove the rationales 524 from the data set 502 in case the rationales 524 indicate some form of implicit bias in decision making. Then the environment-agnostic predictor 606 can generate revised labels 534 based on the revised inputs 532.

Given the discussion thus far, it will be appreciated that, in general terms, one aspect of the invention provides an exemplary method 400 for improving actual labels 516 that are produced by a black box computer classifier system from inputs. The method includes: at 416 identifying a subset of the inputs as an explanatory rationale 524 for the actual labels 516, using an environment-aware predictor 604 and an environment-agnostic predictor 606, wherein the subset of the inputs has a stable correlation with the actual labels across a plurality of environments; at 418 displaying the explanatory rationale with the actual labels to a consumer of the actual labels; and in response to the explanatory rationale failing a rubric established by the consumer: at 420 generating revised inputs 532 by removing the explanatory rationale from the inputs; and at 422 producing revised labels 534 by processing the revised inputs with the environment-agnostic predictor. In some instances, the method stops after the display and functions as a user interface enhancement; i.e., 420 and 422 can be omitted.

As will be appreciated by the skilled artisan, so-called black-box classifiers, such as artificial neural networks and support vector machines, are referred to in that manner because, by themselves, they cannot provide appropriate explanations as to how the classification results are derived. One or more embodiments advantageously provide insight into the decision-making process.

In one or more embodiments, identifying the subset of the inputs comprises applying game-theoretic invariant rationalization to maximize a performance of the environment-agnostic predictor while minimizing a difference in performance between the environment-agnostic predictor and the environment-aware predictor.

In one or more embodiments, the method further comprises: at 402 dividing the inputs into first and second groups of data 504a, 504b; and training the environment-aware predictor 604 and the environment-agnostic predictor 606. The predictors are trained by repeatedly: at 408 generating environment-aware labels 510a, 510b by the environment-aware 604 predictor processing the first and second groups of data 504a, 504b and identifiers 512a, 512b of the first and second groups of data; at 410 generating environment-agnostic labels 514a, 514b by the environment-agnostic predictor 606 processing the first and second groups of data 504a, 504b without the identifiers of the first and second groups of data; at 412 calculating information losses 518, 520 for the environment-aware predictor 604 and for the environment-agnostic predictor 606 by comparing the environment-aware labels 510a, 510b and the environment-agnostic labels 514a, 514b to the actual labels 516; and at 413 adjusting weights of the environment-aware predictor 604 and of the environment-agnostic predictor 606 to achieve local minima of information losses.

In one or more embodiments, the method further comprises: at 406 generating from the inputs a first putative rationale 508a and a second putative rationale 508b, wherein at least one putative rationale includes a portion of the inputs different from any portion included by the other putative rationale; at 408 and 410 generating first environment-aware labels 510a and first environment-agnostic labels 514a by the environment-aware predictor 604 and the environment-agnostic predictor 606 respectively processing the first putative rationale 508a; at 408 and 410 generating second environment-aware labels 510b and second environment-agnostic labels 514b by the environment-aware predictor 604 and the environment-agnostic predictor 606 respectively processing the second putative rationale 508b; at 414 calculating a difference in first information losses between the environment-aware predictor and the environment-agnostic predictor for the first putative rationale, wherein the first information losses are obtained by comparison of the first environment-aware labels and environment-agnostic labels to the actual labels; at 414 calculating a difference in second information losses between the environment-aware predictor and the environment-agnostic predictor for the second putative rationale, wherein the second information losses are obtained by comparison of the second environment-aware labels and environment-agnostic labels to the actual labels; and at 416 selecting, as the explanatory rationale, the one of the first and second putative rationales that generates the smaller difference in information losses between the environment-aware predictor and the environment-agnostic predictor.

In one or more embodiments, the environment-agnostic predictor performs natural language processing (NLP) on a corpus of text that constitutes the inputs. In one or more embodiments, the rubric includes a list of verbs, a list of nouns, a list of adjectives, and/or a list of geographic coordinates.

According to another aspect, a non-transitory computer readable medium embodies computer executable instructions which when executed by a computer cause the computer to facilitate a method for improving actual labels produced by a black box computer classifier system from inputs, generally as discussed above.

According to another aspect, an exemplary method 400 for correcting implicit bias in human decision making comprises: obtaining actual labels 516 that were applied by a human decisionmaker to inputs that include confounding data and an explanatory rationale, wherein the confounding data and the explanatory rationale are not initially distinguished from each other; at 416 distinguishing the explanatory rationale 524 from the confounding data, by identifying a stable correlation of the explanatory rationale with the actual labels across a plurality of environments using an environment-aware predictor 604 and an environment-agnostic predictor 606; and at 530 informing a responsible party (human decision maker and/or her/his supervisor) that the explanatory rationale matches a pertinent rubric (e.g. a rubric established by the supervisor). In one or more embodiments, the method also includes at 420 generating revised inputs by removing the explanatory rationale from the inputs; and at 422 producing revised labels by processing the revised inputs with the environment-agnostic predictor.

Figure 8:
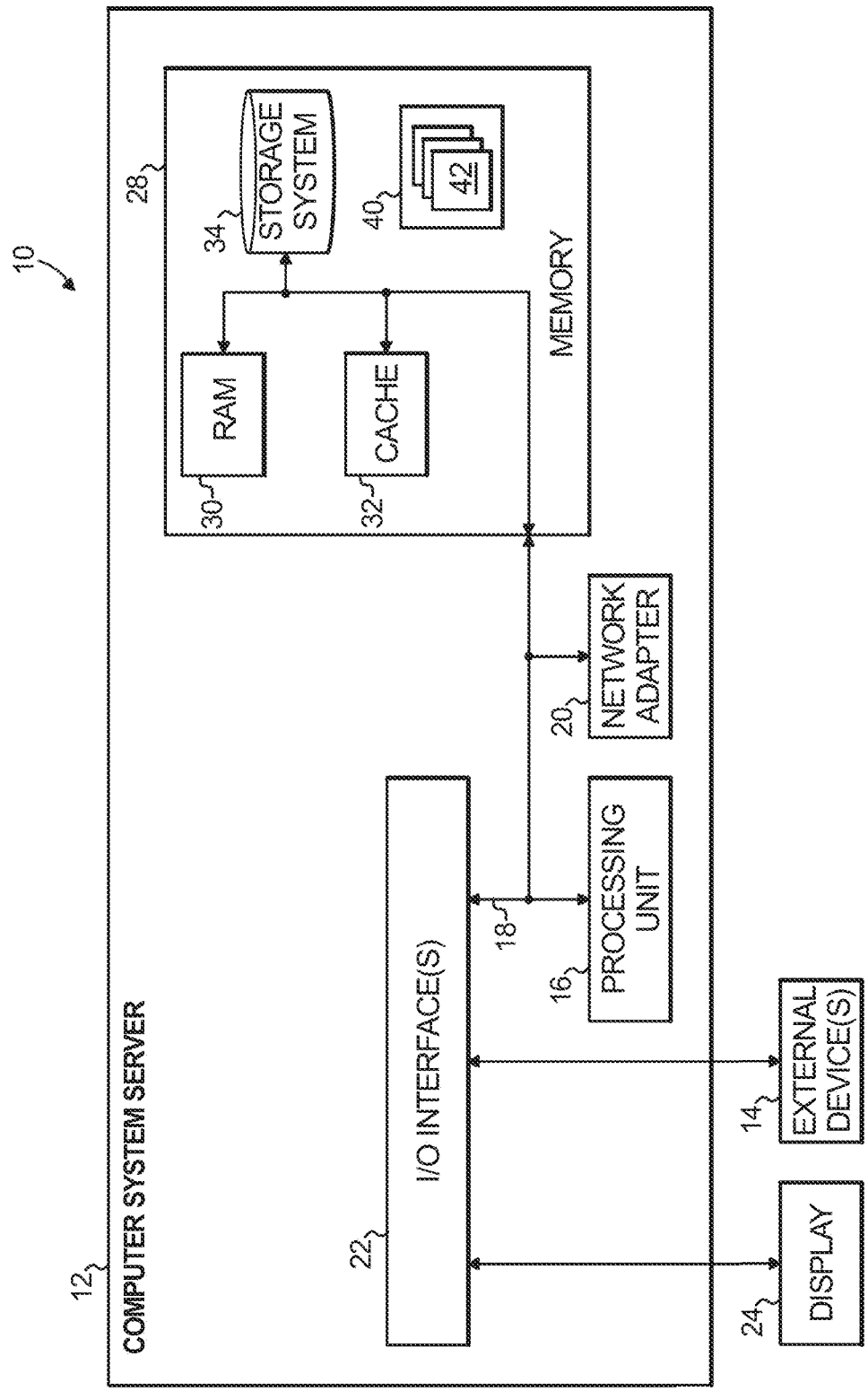
FIG. 8 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to facilitate exemplary method steps, or in the form of a non-transitory computer readable medium embodying computer executable instructions which when executed by a computer cause the computer to facilitate exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text, particularly the descriptions of components of the system 96.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described (e.g., blocks 602, 604, 606). The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving actual labels that are produced by a black box computer classifier system from inputs, the method comprising:
   identifying, using an environment-aware predictor and an environment-agnostic predictor, a subset of the inputs that suffice to yield the actual labels produced by the black box computer classifier system, wherein the subset of the inputs has a stable correlation with the actual labels across a plurality of environments;
   identifying the subset of the inputs that suffice to yield the actual labels produced by the black box computer classifier system as an explanatory rationale for the actual labels;
   displaying the subset of the inputs that suffice to yield the actual labels produced by the black box computer classifier system with the actual labels to a consumer of the actual labels; and
   in response to the explanatory rationale failing a rubric established by the consumer:
      generating revised inputs by removing the subset of the inputs that suffice to yield the actual labels produced by the black box computer classifier system from the inputs; and
      producing revised labels by processing the revised inputs with the environment- agnostic predictor.

2. A method for improving actual labels that are produced by a black box computer classifier system from inputs, the method comprising:
   identifying, using an environment-aware predictor and an environment-agnostic predictor, a subset of the inputs, wherein the subset of the inputs has a stable correlation with the actual labels across a plurality of environments;
   identifying the subset of the inputs as an explanatory rationale for the actual labels;
   displaying the explanatory rationale with the actual labels to a consumer of the actual labels; and
   in response to the explanatory rationale failing a rubric established by the consumer:
      generating revised inputs by removing the explanatory rationale from the inputs; and
      producing revised labels by processing the revised inputs with the environment-agnostic predictor, wherein identifying the subset of the inputs comprises applying game-theoretic invariant rationalization to maximize a performance of the environment-agnostic predictor while minimizing a difference in performance between the environment-agnostic predictor and the environment-aware predictor.

3. The method of claim 1, further comprising:
   dividing the inputs into first and second groups of data; and
   training the environment-aware predictor and the environment-agnostic predictor by repeatedly:
      generating environment-aware labels by the environment-aware predictor processing the first and second groups of data and identifiers of the first and second groups of data;
      generating environment-agnostic labels by the environment-agnostic predictor processing the first and second groups of data without the identifiers of the first and second groups of data;
      calculating information losses for the environment-aware predictor and for the environment-agnostic predictor by comparing the environment-aware labels and the environment-agnostic labels to the actual labels; and
      adjusting weights of the environment-aware predictor and of the environment-agnostic predictor to achieve local minima of information losses.

4. The method of claim 1, further comprising:
generating from the inputs a first putative rationale and a second putative rationale, wherein at least one putative rationale includes a portion of the inputs different from any portion included by the other putative rationale;
generating first environment-aware labels and first environment-agnostic labels by the environment-aware predictor and the environment-agnostic predictor respectively processing the first putative rationale;
generating second environment-aware labels and second environment-agnostic labels by the environment-aware predictor and the environment-agnostic predictor respectively processing the second putative rationale;
calculating a difference in first information losses between the environment-aware predictor and the environment-agnostic predictor for the first putative rationale, wherein the first information losses are obtained by comparison of the first environment-aware labels and environment-agnostic labels to the actual labels;
calculating a difference in second information losses between the environment-aware predictor and the environment-agnostic predictor for the second putative rationale, wherein the second information losses are obtained by comparison of the second environment-aware labels and environment-agnostic labels to the actual labels; and
selecting, as the explanatory rationale, the one of the first and second putative rationales that generates the smaller difference in information losses between the environment-aware predictor and the environment-agnostic predictor.

5. The method of claim 1 wherein the environment-agnostic predictor performs natural language processing (NLP) on a corpus of text that constitutes the inputs.

6. The method of claim 1 wherein the rubric includes a list of verbs.

7. The method of claim 1 wherein the rubric includes a list of nouns.

8. The method of claim 1 wherein the rubric includes a list of adjectives.

9. The method of claim 1 wherein the rubric includes a list of geographic coordinates.

10. A method for correcting implicit bias in human decision making, the method comprising:
obtaining actual labels that were applied by a human decisionmaker to inputs that include confounding data and an explanatory rationale, wherein the confounding data and the explanatory rationale are not initially distinguished from each other;
distinguishing the explanatory rationale from the confounding data, by identifying a stable correlation of the explanatory rationale with the actual labels across a plurality of environments using an environment-aware predictor and an environment-agnostic predictor;
informing a responsible party that the explanatory rationale matches a pertinent rubric; and
generating revised inputs by removing the explanatory rationale.

11. The method of claim 10, further comprising:
training the environment-aware predictor and the environment-agnostic predictor by repeatedly:
generating environment-aware labels by the environment-aware predictor processing the first and second groups of data and identifiers of the first and second groups of data;
generating environment-agnostic labels by the environment-agnostic predictor processing the first and second groups of data without the identifiers of the first and second groups of data;
calculating information losses for the environment-aware predictor and for the environment-agnostic predictor by comparing the environment-aware labels and the environment-agnostic labels to the actual labels; and
adjusting weights of the environment-aware predictor and of the environment-agnostic predictor to achieve local minima of information losses.

12. The method of claim 11, wherein identifying the stable correlation of the explanatory rationale with the actual labels comprises:
dividing the inputs into first and second groups of data;
producing a first putative rationale by selecting first matching sections of the first and second groups of data;
producing a second putative rationale by selecting second matching sections of the first and second groups of data, wherein the second matching sections differ from the first matching sections;
calculating a difference in information loss between the environment-aware predictor and the environment-agnostic predictor for the first putative rationale and for the second putative rationale; and
selecting as the explanatory rationale the one of the first and second putative rationales that generates the smaller difference in information loss between the environment-aware predictor and the environment-agnostic predictor.

13. The method of claim 10 wherein the machine learning algorithm performs natural language processing (NLP) on a corpus of text that constitutes the inputs.

14. The method of claim 10, further comprising:
generating revised inputs by removing the explanatory rationale from the inputs; and
producing revised labels by processing the revised inputs with the environment-agnostic predictor.

15. A non-transitory computer readable medium embodying computer executable instructions which when executed by a computer cause the computer to facilitate a method for improving actual labels produced by a black box computer classifier system from inputs, the method comprising:
identifying, using an environment-aware predictor and an environment-agnostic predictor, a subset of the inputs that suffice to yield the actual labels produced by the black box computer classifier system, wherein the subset of the inputs has a stable correlation with the actual labels across a plurality of environments;
identifying the subset of the inputs that suffice to yield the actual labels produced by the black box computer classifier system as an explanatory rationale for the actual labels;
displaying the subset of the inputs that suffice to yield the actual labels produced by the black box computer classifier system with the actual labels to a consumer of the actual labels; and
in response to the explanatory rationale failing a rubric established by the consumer:
generating revised inputs by removing the subset of the inputs that suffice to yield the actual labels produced by the black box computer classifier system from the inputs; and
producing revised labels by processing the revised inputs with the environment-agnostic predictor.

16. A non-transitory computer readable medium embodying computer executable instructions which when executed by a computer cause the computer to facilitate a method for improving actual labels produced by a black box computer classifier system from inputs, the method comprising:
   identifying, using an environment-aware predictor and an environment-agnostic predictor, a subset of the inputs, wherein the subset of the inputs has a stable correlation with the actual labels across a plurality of environments;
   identifying the subset of the inputs as an explanatory rationale for the actual labels;
   displaying the explanatory rationale with the actual labels to a consumer of the actual labels; and
   in response to the explanatory rationale failing a rubric established by the consumer:
      generating revised inputs by removing the explanatory rationale from the inputs; and
      producing revised labels by processing the revised inputs with the environment-agnostic predictor, wherein identifying the subset of the inputs comprises applying game-theoretic invariant rationalization to maximize a performance of the environment-agnostic predictor while minimizing a difference in performance between the environment-agnostic predictor and the environment-aware predictor.

17. The computer readable medium of claim 15, the method further comprising:
   dividing the inputs into first and second groups of data; and
   training the environment-aware predictor and the environment-agnostic predictor by repeatedly:
      generating environment-aware labels by the environment-aware predictor processing the first and second groups of data and identifiers of the first and second groups of data;
      generating environment-agnostic labels by the environment-agnostic predictor processing the first and second groups of data without the identifiers of the first and second groups of data;
      calculating information losses for the environment-aware predictor and for the environment-agnostic predictor by comparing the environment-aware labels and the environment-agnostic labels to the actual labels; and
      adjusting weights of the environment-aware predictor and of the environment-agnostic predictor to achieve local minima of information losses.

18. The computer readable medium of claim 15, the method further comprising:
   generating from the inputs a first putative rationale and a second putative rationale, wherein at least one putative rationale includes a portion of the inputs different from any portion included by the other putative rationale;
   generating first environment-aware labels and first environment-agnostic labels by the environment-aware predictor and the environment-agnostic predictor respectively processing the first putative rationale;
   generating second environment-aware labels and second environment-agnostic labels by the environment-aware predictor and the environment-agnostic predictor respectively processing the second putative rationale;
   calculating a difference in first information losses between the environment-aware predictor and the environment-agnostic predictor for the first putative rationale, wherein the first information losses are obtained by comparison of the first environment-aware labels and environment-agnostic labels to the actual labels;
   calculating a difference in second information losses between the environment-aware predictor and the environment-agnostic predictor for the second putative rationale, wherein the second information losses are obtained by comparison of the second environment-aware labels and environment-agnostic labels to the actual labels; and
   selecting, as the explanatory rationale, the one of the first and second putative rationales that generates the smaller difference in information losses between the environment-aware predictor and the environment-agnostic predictor.

19. The computer readable medium of claim 18, wherein the environment-agnostic predictor performs natural language processing (NLP) on a corpus of text that constitutes the inputs.

20. The computer readable medium of claim 18, wherein the rubric includes at least one of a list of verbs, a list of nouns, a list of adjectives, and a list of geographic coordinates.

* * * * *